United States Patent [19]
McNamara et al.

[11] Patent Number: 5,436,902
[45] Date of Patent: Jul. 25, 1995

[54] ETHERNET EXTENDER

[75] Inventors: Robert P. McNamara; Amar Amar, both of San Jose, Calif.

[73] Assignee: First Pacific Networks, San Jose, Calif.

[21] Appl. No.: 223,209

[22] Filed: Apr. 5, 1994

[51] Int. Cl.⁶ ............... H04L 12/46; H04L 12/66
[52] U.S. Cl. ............... 370/85.3; 370/85.13; 370/94.1
[58] Field of Search ............... 370/85.13, 85.14, 85.15, 370/85.2, 85.3, 85.4, 94.1, 94.2, 60, 60.1; 340/825.05, 825.5, 825.51

[56] References Cited

U.S. PATENT DOCUMENTS

| | | | |
|---|---|---|---|
| 4,675,866 | 6/1987 | Takumi et al. | 370/85.1 |
| 4,897,841 | 1/1990 | Gang, Jr. | 370/85.13 |
| 4,989,203 | 1/1991 | Phinney | 370/85.13 |
| 5,255,268 | 10/1993 | Cato et al. | 370/85.13 |

*Primary Examiner*—Wellington Chin
*Attorney, Agent, or Firm*—Townsend and Townsend Khourie and Crew; Kenneth R. Allen

[57] ABSTRACT

A telecommunication bridge system uses synchronized arbitration in a portion of a frame of a Radio Frequency (RF) subsystem and is transparent to Ethernet layer protocols and Ethernet-type packets in order to increase bandwidth utilization and effectively extend Ethernet networks to metropolitan-area-wide application. The telecommunication bridge system comprises an enhanced Ethernet network interface subsystem coupled to a conventional Ethernet medium and a control subsystem including an RF modem, in turn coupled to a frame synchronized RF medium in a metropolitan-sized network. On one side the control subsystem emulates all Ethernet layer protocols and on the other side conducts a prioritized arbitration scheme during only a portion of a time division multiplexed frame, the remainder of the frame for carrying a payload of unmodified packets to other bridges. Included in the controller subsystem is a two-way Manchester/NRZ Code converter, its own intelligence and packet buffering using a microprocessor and random access memory.

2 Claims, 3 Drawing Sheets

ETHERNET EXTENDER

BACKGROUND OF THE INVENTION

This invention relates to adaptation of CSMA/CD-type networks, and particularly Ethernet to long-distance communication, and specifically for metropolitan area networking. Standard Ethernet type communication (IEEE/ANSI Standard 802.3) is intended primarily for local data communication, typically over lines less than 1800 meters (1.1 miles) in radius. Ethernet employs carrier sense multiple access/carrier detection (CSMA/CD) protocols. Such protocols under 802.3 require a baseband carrier signal in order to permit the sensing of the presence or absence of collisions among potentially-interfering signals. The protocols also specify that nodes must be able to communicate within a defined time short interval, which limits the radius of communication to relatively short ranges.

Bridges and routers are known for redirecting signals originating or terminating in an Ethernet node through various other media, including broad-band and narrow-band links. Such links may be either speed-limited or distance-limited, or they may require substantial protocol conversion. Specifically, it is considered desirable to keep the MAC CSMA/CD layer of Ethernet intact to the extent possible.

A line of telephone central office bypass digital network communication products is available from the assignee of the present invention, First Pacific Networks of Sunnyvale, Calif. (FPN), which supports high-speed, metropolitan-area digital communication. Heretofore no bridge has been provided which can be used as an interface between conventional Ethernet nodes via the FPN network.

What is needed is a mechanism for extending a local area network to a substantially greater range, e.g., in the metropolitan area range of 50 km to 100 km in radius, without degradation in speed or response time.

SUMMARY OF THE INVENTION

According to the invention, a telecommunication bridge system uses synchronized arbitration in a portion of a frame of a Radio Frequency (RF) subsystem and is transparent to Ethernet layer protocols and Ethernet-type packets in order to increase bandwidth utilization and effectively extend Ethernet networks to metropolitan-area-wide application. The telecommunication bridge system comprises an enhanced Ethernet network interface subsystem coupled to a conventional Ethernet medium and a control subsystem including an RF modem, in turn coupled to a frame synchronized RF medium in a metropolitansized network. On one side the control subsystem emulates all Ethernet layer protocols and on the other side conducts a prioritized arbitration scheme during only a portion of a time division multiplexed frame, the remainder of the frame for carrying a payload of unmodified packets to other bridges. Included in the controller subsystem is a two-way Manchester/NRZ Code converter, its own intelligence and packet buffering using a microprocessor and random access memory.

The invention will be better understood upon reference to the following detailed description in connection with the accompanying drawings.

DESCRIPTION OF THE PREFERRED EMBODIMENT

Figure 1:
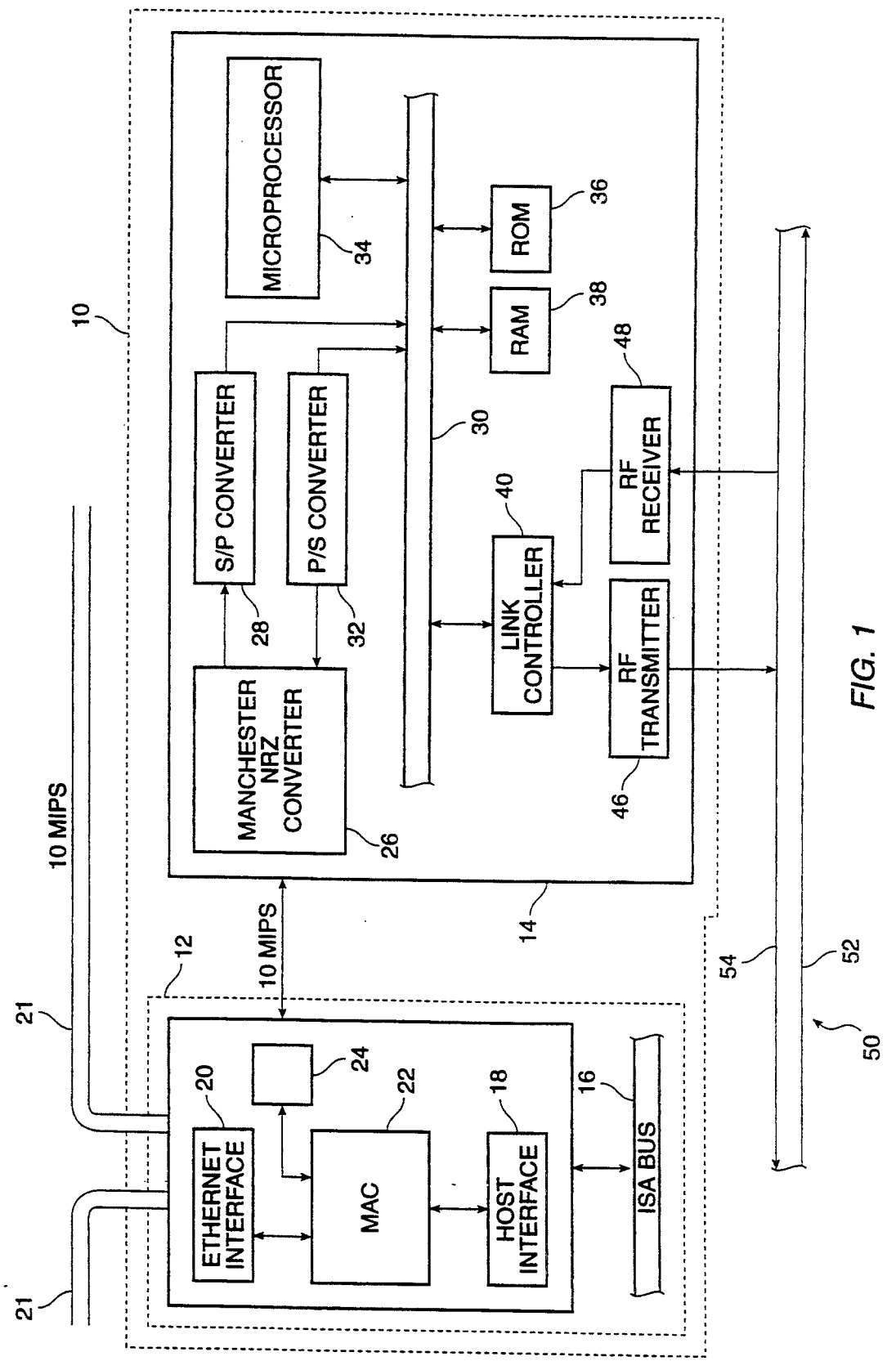
FIG. 1 is a block diagram of a system incorporating the invention.

Referring to FIG. 1, there is shown an Ethernet-broadband bridge 10 in accordance with the invention wherein Ethernet signals are converted to broadband signals and visa versa, and all Ethernet protocols are emulated. The bridge 10 is an adaptation of a conventional Ethernet network interface card (NIC), herein an enhanced NIC 12 or a media access unit (MAU) and an enhanced First Pacific Networks Voice Interface Unit adapted to a general information interface, herein an enhanced interface unit or IU 14. The enhanced NIC 12 is typically a card inserted in a slot on a standard bus 16, such as an ISA bus or an EISA bus of a host personal computer (not shown). The NIC 12 includes a host interface 18 for connecting to the standard bus 16, a baseband Ethernet interface 20 for connection daisy-chain style to an Ethernet medium 21, and a media access controller (MAC) 22. In addition according to the invention is a baseband interface emulator 24. The emulator 24 appears to the MAC 22 as a baseband interface, and it sends and receives signals like any other device having an Ethernet protocol layer, namely, Manchester-encoded packet signals.

The enhanced IU 14 comprises a bidirectional Manchester Code/NRZ Code converter interface 26 for connection to the emulator 24 for converting the packets between conventional Manchester Code and NRZ code as used by the IU 14, a serial to parallel converter 28 for converting incoming serial signals to parallel signals which can be applied to a bus 30, and a parallel to serial converter 32 for converting outgoing signals from the bus 30 directed to the emulator 24.

Also coupled to the bus 30 is a microprocessor 34, with associated program memory (in read only memory ROM 36) and data memory (in random access memory RAM 38), and a link controller 40, as hereinafter explained. The link controller 40 sends and receives packets in frames via broadband media over metropolitan-size distances, takes into account skew and manages the Ethernet layer protocols of the local NIC 12. Typically, the broadband medium is effectively unidirectional, so there is one receive channel for receiving signals from a head end (for example 6 MHz bandwidth supporting 5.1 MBPS or 10.2 MBPS transmission rates (e.g., 50 MHz and higher) and a separate transmit channel for transmitting signals to the head end (e.g., below 50 MHz), the modulation of the signal on each of the respective channels being selected on the basis of criteria outside the scope of this invention, but some form of digital modulation.

Packets are buffered in RAM 38 while the link controller 40 attempts to "capture bandwidth" on the broadband medium 50. The software and hardware at the link layer on the Ethernet medium 21 is unaware of any difference between the enhanced Ethernet NIC 12 and a standard Ethernet NIC, except that the packets experience data delay.

The broadband medium 50 may be channelized so that an upstream channel 52 is in a first r.f. channel and a downstream channel 54 is in a second r.f. channel on the same physical medium, such as a coaxial cable or fiber link. On the broadband medium 50, the r.f. transmitter 46 transmits bursts of packets on upstream channel 52 in synchronized frames (e.g., within a 2 ms long window) to a head end (not shown) which may convert the packets to a synchronous communication mode and send the packets without any internal changes back downstream channel 54 to any other bridge or interface unit 14 according to the invention. The frames may be skewed based on time delay to transmit a signal to the head end so that frames transmitted to the head end line up upon arrival at the head end.

Figure 2:
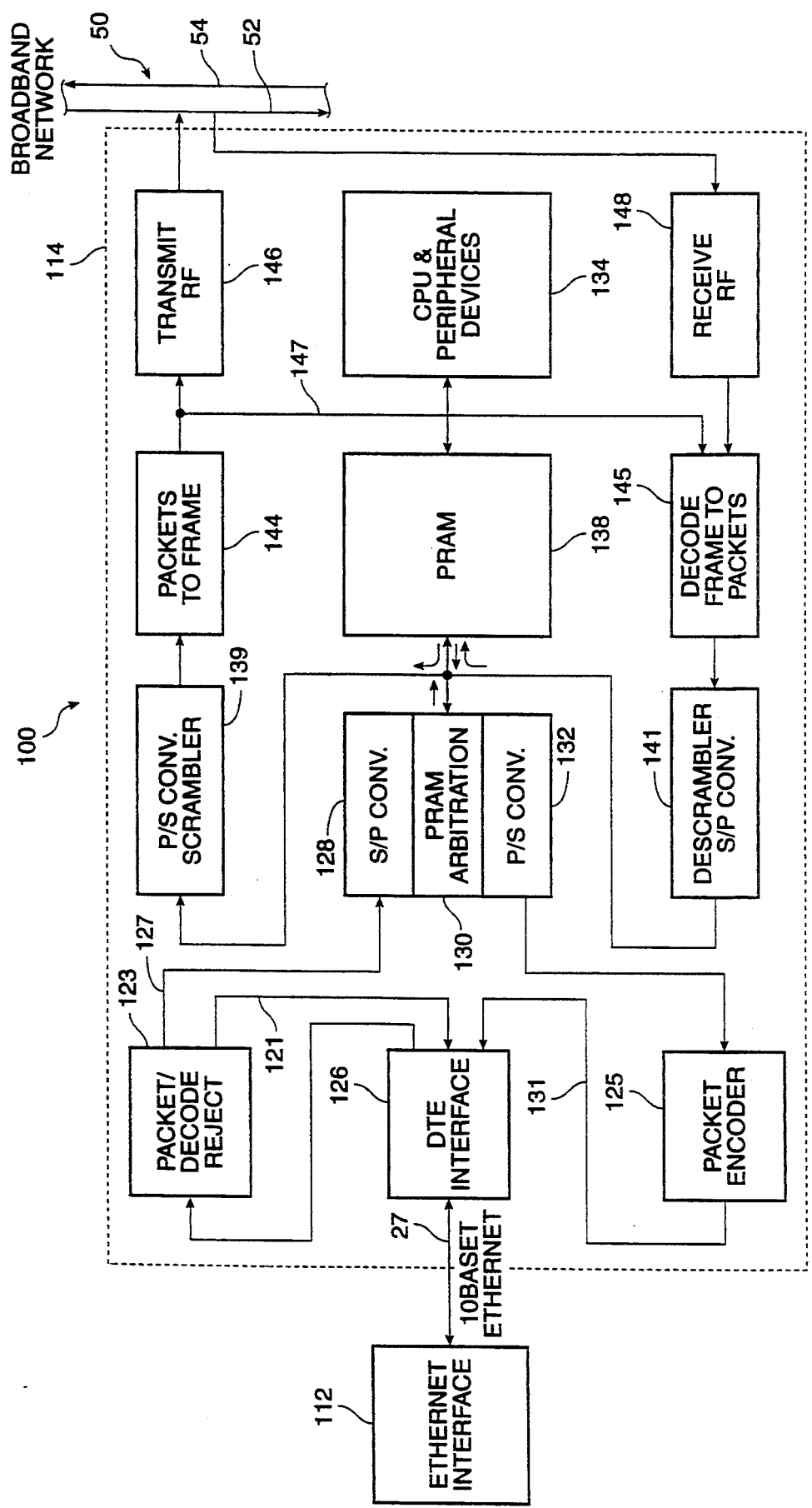
FIG. 2 is an alternative block diagram of a system incorporating the invention.

FIG. 2 is an alternative block diagram of a system 100 incorporating the invention, and specifically an alternative bridge or interface unit 114. In this system 100, enhanced IU 114 comprises a bidirectional DTE interface 126 with a Manchester Code/NRZ Code converter for connection to a 10BaseT-type Ethernet medium 27 which in turn is coupled to a conventional 10BaseT-type Ethernet interface 112 of a personal computer (not shown). The DTE interface 126 is coupled to direct Manchester decoded packets to a packet decoder element 123 and to receive packets ready to be Manchester encoded from a packet encoder 125. The packet decoder 123 includes a flow control mechanism which signals a collision (via line 121) to the DTE interface 126, which in turn can prompt the Ethernet interface 112 to resend the lost packets. The packet decoder 123 strips the packet of data and sends serialized data via line 127 to a serial to parallel converter 128 for converting incoming serial signals to parallel signals which can be applied via an arbitration element 130 to a buffer memory, herein designated a PRAM 138, for storage. Data stored in the PRAM 138 which is directed to the Ethernet interface 112 is forwarded by the PRAM arbitrator 130 and passed through a parallel to serial converter 132 for converting outgoing signals to a serial data stream. The resultant serial data stream is packetized by packet encoder 125 and passed to the DTE interface via line 131 wherein it is Manchester encoded and applied to the 10Base T medium 27.

Also coupled to the PRAM 138 is a CPU 134 with associated peripheral devices. The CPU 134 may massage the data in the PRAM 138, if needed, before it is passed either to the Ethernet interface 112 or to the broadband network 50. The PRAM arbitrator 130 sends parallel data from the PRAM 138 to a parallel/serial converter, scrambler and packet assembler 139. The PRAM arbitrator 130 also directs the PRAM to receive parallel data from serial/parallel converter, descrambler and packet disassembler 141. The PRAM arbitrator 130 thus controls all data traffic through the PRAM 138.

The parallel/serial converter, scrambler and packet assembler 139 scrambles the data using a CCITT V.29-type scrambler using a 24 bit scramble seed ahead of the "scramble payload" and directs packets destined for the broadband network 50 to a packet framer 144. The scrambled signal is useful to assist in clock recovery elsewhere in the system. In the packet framer 144 packets are allocated to frames compatible with the broadband network 50, and r.f. transmitter 46 introduces the frames to the upstream channel 52 in accordance with its protocol. An r.f. receiver 148 receives frames containing packets via the broadband network 50 medium over metropolitan-sized distances from a head end (not shown). The received frames are reformatted as packets in frame-to-packet decoder 145, which in turn directs the packets to serial/parallel converter, descrambler and packet disassembler 141 for forwarding as previously explained. The software and hardware at the link layer on the Ethernet interface 112 is unaware of any difference between the source of the Ethernet data, except that the packets may experience data delay. A digital loopback 147 to allow transmit frame data to be connected to receive frame decoder 145 allowing self test without need for external testing equipment.

Figure 3:
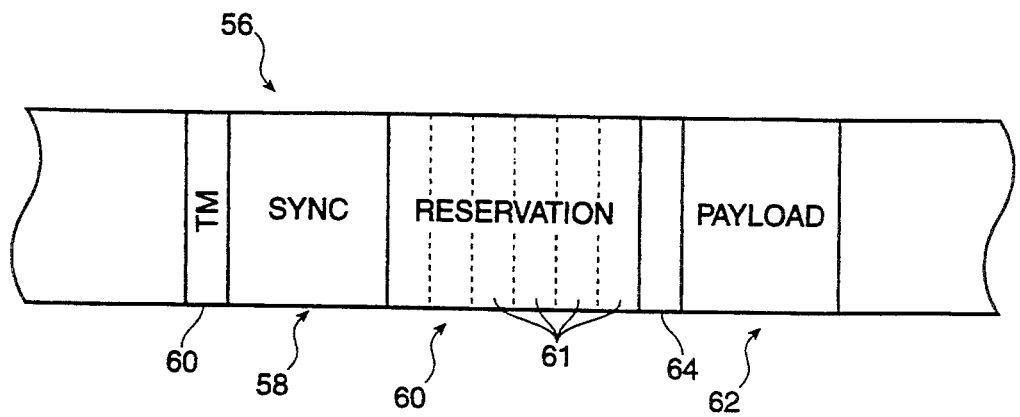
FIG. 3 is a timing diagram of a frame in accordance with the invention.
Figure 4:
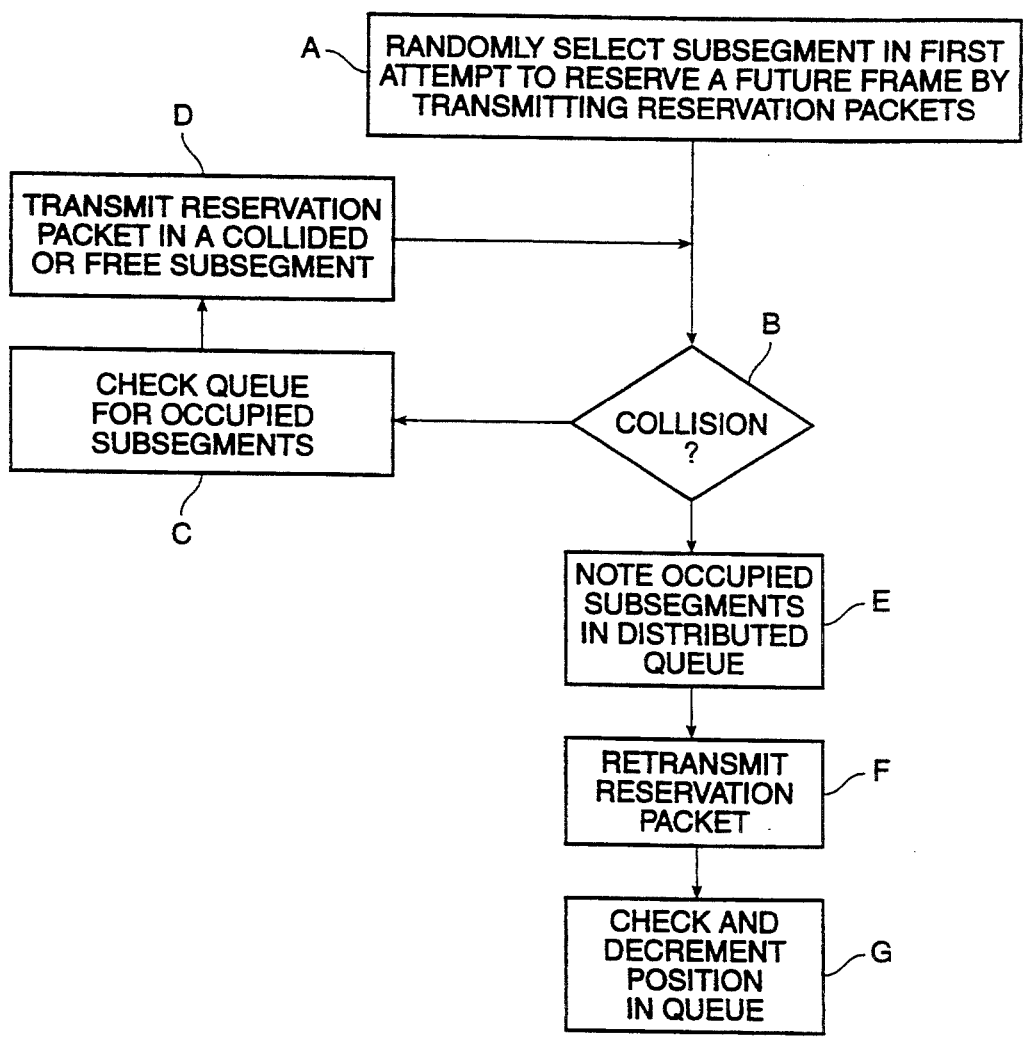
FIG. 4 is a flow chart of an arbitration technique according to the invention.

FIG. 3 illustrates a standard time frame 56 (about 2 ms in length) which consumes the bandwidth (about 10 MHz) in the upstream channel 52. The frame 56 is divided into three segments, a synchronization segment 58 containing a frame timing mark indicating its boundary and any other synchronizing information to take into account skew (e.g., 12 bytes long), a reservation segment 60 wherein arbitration is carried out (e.g., 180 bytes long), and a payload segment 62 which carries the unmodified Ethernet packets (up to about 2100 bytes available). A gap 64 of a few bytes (e.g., 3 bytes) is provided for separation between the reservation segment 60 and the payload segment 62.

According to the invention, collision detection on the upstream frame is limited to the reservation segment. More specifically, up to about fifteen or thirty different bridges can attempt simultaneously to reserve a frame during the reservation segment 60, or more specifically to reserve the payload segment 62 of a different future timed frame, so that the payload segments 62 of frames 56 for communication to the head end can be allocated into the future, e.g., for up to fifteen frames. This is done through the link controller 40 which is operative to subdivide the reservation segment 60 into a plurality of subsegments 61, each subsegment 61 being employed to arbitrate for access to the payload segment of a different future timed frame.

This foreknowledge of bandwidth utilization allows each link controller 40 to make maximum bandwidth utilization while minimizing control overhead and lost bandwidth due to avoidable collisions. Collisions during the reservation segment 60 of the frame 56 are expected, although the collisions are limited to those subsegments which have not yet been reserved as part of the distributed queue. The link controllers 40 of each active bridge build a distributed queue, that is, each bridge keeps an identical copy of the reservation queue, updating it each frame, advancing its own queue position of each of its own payloads awaiting a frame each time a payload is cleared, and transmitting a reservation packet at the reservation subsegment to which it believes it has been assigned currently. Only one controller 40 uses the payload segment 62 at any one time, since peer arbitration predetermines which bridge is granted the payload segment of the forthcoming frames. In this manner, efficient bandwidth utilization can be achieved with excellent collision avoidance and substantially higher throughput as compared with an Ethernet network of the same bit rate, as well as higher likelihood that a packet will be transmitted successfully than with conventional CSMA/CD protocols.

FIG. 3 is a flow chart illustrating the arbitration scheme according to the invention. Access rules respecting the reservation subsegments govern operation of the link controller 40. First, all bandwidth is reserved at least one frame in advance. Second, all packets are queued for future payload segments. Where the packet queue (in RAM 38) in any bridge 10 is empty and the upstream channel 52 of the network 50 is not busy, bandwidth is reserved by each IU 14 randomly selecting any one of the reservation subsegments 61 by each controller 40 of each IU 14 transmitting a reservation packet during the randomly-selected reservation subsegment (Step A FIG. 3), each one of the reservation subsegments representing a specific future frame. If a collision occurs (Step B), then the IU 14 checks the distributed queue for occupied subsegments (Step C) and then transmits a reservation packet during a randomly selected one of the remaining subsegments (Step D) and again checks for a collision (Step B). If no collision occurs, then all IUs 14 note the reservation of the corresponding payload segment of a future frame in the distributed queue (Step E). The reservation packet of the respective IUs 14 are then retransmitted each subsequent frame (Step F), this time in the reservation subsegment in which they were previously successfully transmitted and thus corresponding to a numerical position in the distributed queue. As payload packets clear the queue, each IU 14 checks the queue and decrements its own position of reservation in the distributed queue so the reservation packets advance in their position in the reservation segment (Step G), and each IU 14 retransmits a reservation packet at its new subsegment position in the reservation segment 60 (Step F).

Queued packets in the bridge are typically assigned to payload segments of future frames in the order received, subject to other bridges having been granted prior access to a specific payload segment of a future frame.

Each reservation packet contains several pieces of information: a preamble, a delimiter (for determining byte synchronization and occurrence of a collision), a unique node number, and payload packet length. The payload packet may be transmitted with or without certain preamble or postamble information, depending upon whether the information can be restored at the receiving bridge and upon the design efficiency of the communication channel.

For extremely long payloads, payload segments of successive frames can be employed to transmit the whole payload. A short portion of the payload channel may be employed to carry a flag to indicate to the receiving bridge that the payload segments must be appended before being forwarded into the target Ethernet environment.

The invention has been explained with reference to specific embodiments. Other embodiments will be apparent to those of ordinary skill in the art. It is therefore not intended that this invention be limited, except as indicated by the appended claims.

What is claimed is:

1. An apparatus for interfacing between an Ethernet local area network and a metropolitan area data communication network comprising:

a circuit means forming a local area network node for connecting to an Ethernet local area network via an Ethernet medium;

a bridge subsystem coupled to said connection means which is operative to accept Ethernet packets and to control access to the metropolitan area data communication network, said bridge subsystem including:

a modem subsystem coupled to a wide area network medium of the metropolitan area data communication network for communicating Ethernet-type packets over a frequency channel of the metropolitan area data communication network, said frequency channel employing timed frames during which each one of said Ethernet-type packets is conveyed, link control means for allocating time in each one of said time frames into at least a first (reservation) segment and a second (payload) segment, said second segment being of sufficient capacity to contain an unmodified one of said Ethernet-type packets, and said first segment being for arbitrating among bridge subsystems requesting access to said frequency channel;

means for buffering said Ethernet-type packets; and control means for arbitrating access to said wide area network medium, wherein said control means is operative to subdivide said first segment into a plurality of subsegments, each said subsegment being employed to arbitrate for access to the second segment of a future timed frame.

2. A method for arbitrating among bridges requesting access to time frames in a metropolitan area digital data communication system comprising the steps of:

establishing a first (reservation) time segment and a second (payload) time segment of a frame for communication of digital packets;

establishing within said first time segment a plurality of reservation subsegments;

at each said bridge first transmitting a reservation packet the reservation subsegment corresponding with a position in a queue and observing for a collision;

thereafter and during each successive frame if no collision has occurred, at each such bridge, transmitting the reservation packet, with identification of the reservation subsegment, in the reservation subsegment corresponding with said position in a queue; and upon clearing of each said reservation packet from said position in the queue and during each successive frame, at each bridge, transmitting said reservation packet in the reservation subsegment corresponding with said position in the queue.

* * * * *